US008363316B2

(12) United States Patent
Asundi et al.

(10) Patent No.: US 8,363,316 B2
(45) Date of Patent: Jan. 29, 2013

(54) DIGITAL HOLOGRAPHIC MICROSCOPY

(75) Inventors: Anand Krishna Asundi, Singapore (SG); Weijuan Qu, Singapore (SG); Oi Choo Chee, Singapore (SG)

(73) Assignees: Nanyang Technological University, Singapore (SG); Ngee Ann Polytechnic, Singapore (SG)

( * ) Notice: Subject to any disclaimer, the term of this patent is extended or adjusted under 35 U.S.C. 154(b) by 831 days.

(21) Appl. No.: 12/545,760

(22) Filed: Aug. 21, 2009

(65) Prior Publication Data
US 2011/0043878 A1    Feb. 24, 2011

(51) Int. Cl.
*G02B 21/00* (2006.01)
(52) U.S. Cl. .......................... 359/368; 359/370
(58) Field of Classification Search .............. 359/29, 359/30, 31, 368, 370
See application file for complete search history.

(56) References Cited

U.S. PATENT DOCUMENTS

| 6,038,041 A * | 3/2000 | Poon et al. ................... 359/1 |
| 6,262,818 B1 | 7/2001 | Cuche et al. |
| 6,775,037 B1 * | 8/2004 | Lee ............................ 359/35 |
| 2009/0185195 A1 * | 7/2009 | Liesener et al. ............... 356/521 |
| 2010/0060897 A1 * | 3/2010 | Gustafsson ................... 356/458 |
| 2010/0060962 A1 * | 3/2010 | Rosen ........................ 359/29 |

OTHER PUBLICATIONS

Colomb et al., Applied Optics (2006) 45(5):851-863.
Colomb et al., J Opt Soc Am A (2006) 23(12):3177-3190.
Colomb et al., Optics Express (2006) 14(10):4300-4306.
Cuche et al., Applied Optics (1999) 38(34):6994-7001.
Daly et al., Meas Sci Technol (1990) 1:759-766.
Ferrari and Frins, Optics Communications (2007) 279:235-239.
Mann et al., Optics Express (2005) 13(22):8693-8698.
Marquet et al., Optics Letters (2005) 30(5):468-470.
Montfort et al., J Opt Soc Am A (2006) 23(11):2944-2953.
Rappaz et al., Optics Express (2005) 13(23):9361-9373.
Weijuan et al., Optics Letters (2009) 34(8):1276-1278.
Zhi et al., Applied Physics Letters (2006) 89:112912-1-112912-3.

* cited by examiner

*Primary Examiner* — Frank Font
(74) *Attorney, Agent, or Firm* — Morrison & Foerster LLP

(57) ABSTRACT

An optical configuration for a digital holographic microscope and a method for digital holographic microscopy are presented. In one embodiment, digital off-axis holograms are obtained using a cube beam splitter (110) to both split and combine a diverging spherical wavefront emerging from a microscope objective (108). When a plane numerical reference wavefront is used for the reconstruction of the recorded digital hologram, the phase curvature introduced by the microscope objective (108) together with the illuminating wave to the object wave can be physically compensated.

23 Claims, 4 Drawing Sheets

DIGITAL HOLOGRAPHIC MICROSCOPY

FIELD OF THE INVENTION

The present invention relates generally to digital holographic microscopy, and more particularly, but not exclusively, to digital holographic microscopy with physical phase compensation.

BACKGROUND TO THE INVENTION

Image recording of a specimen is most commonly carried out based on a recording of the intensity of light received from the specimen. However, since the interaction of light with a specimen modifies both the light intensity and phase, image recording can also be carried out based on phase detection.

Holography provides a means by which both phase and intensity information can be determined from a single record called a hologram. To obtain a hologram using conventional techniques, a source beam is first split by a beam splitter into a first part, and a second part that is sent to the specimen. The first part is commonly referred to as a reference wave while light from the second part that is scattered from the specimen is referred to as an object wave. The reference wave and object wave are then arranged to interfere with one another, thus producing a complex interference pattern of spaced fringes. This pattern is called the hologram. The hologram essentially freezes the intricate wavefront of light from the specimen. When the hologram is reconstructed (e.g. by illuminating the hologram with a reconstruction wave), a virtual image of the specimen is obtained.

In digital holographic microscopy, the hologram is recorded using digital recording devices (e.g. a digital camera) as opposed to conventional photographic plates. Numerical reconstruction of the hologram is then carried out to reconstruct the wavefront from the specimen digitally.

Digital holographic microscopy has in recent times been implemented in combination with a microscope objective to provide magnification of a test specimen. This implementation has shown great success in the quantitative study of material and life science applications with sub-nanometer resolution. However, it has been found that the microscope objective introduces a phase curvature to the object wave. Since the phase curvature is not present in the reference wave, interference of the object wave and reference wave will produce a hologram that results in a distorted reconstruction. It is therefore desirable to remove or compensate the phase curvature of the object wave.

One approach to remove the phase curvature is by way of numerical compensation in the reconstruction process. To do this, a numerical phase mask is developed. Examples have been described by T. Colomb et al in 'Numerical parametric lens for shifting, magnification, and complete aberration compensation in digital holographic microscopy,' J. Opt. Soc. Am. A 23, 3177 (2006), and 'Automatic procedure for aberration compensation in digital holographic microscopy and applications to specimen shape compensation,' Appl. Opt. 45, 851 (2006), and by F. Montfort et al in 'Purely numerical compensation for microscope objective phase curvature in digital holographic microscopy: influence of digital phase mask position,' J. Opt. Soc. Am. A 23, 2944 (2006). Another approach to remove the phase curvature involves using a reference hologram recorded by the same setup without the test specimen, as proposed by T. Colomb et al in 'Total aberrations compensation in digital holographic microscopy with a reference conjugated hologram,' Opt. Express 14, 4300 (2006). Both approaches are done numerically, which complicates the reconstruction algorithm and makes numerical reconstruction a time-consuming process.

It is also known to introduce physically the same curvature in the reference wave, such as through a Linnik interferometer or a Mach-Zehnder interferometer. In these configurations, the use of the measurement optics in the reference arm duplicates the objective measurement optics in the object arm so that curvature of the object wave is compensated during interference by the same curvature in the reference wave. This, however, requires a precise alignment of all the involved optical elements.

SUMMARY OF THE INVENTION

The present invention is defined in the appended independent claims. Some optional features of the present invention are defined in the appended dependent claims.

In general terms, the present invention relates to an optical configuration for digital holographic microscopy for physically (as opposed to numerically) compensating for the phase curvature introduced by a microscope objective.

In one specific expression, the present invention relates to a digital holographic microscope comprising: a microscope objective configured to receive radiation from an object and to provide a beam of radiation having a phase curvature, a beam splitter configured to split the beam of radiation into a first portion and a second portion, introduce an optical path difference between the first and second portions, and combine the first and second portions to produce an interference pattern that is substantially free of the phase curvature, and a transducer configured to generate digital hologram signals indicative of the interference pattern.

Preferably the beam splitter is a cube beam splitter having a central semi-reflective layer.

Preferably the cube beam splitter is arranged to receive the beam of radiation on two outer walls.

Preferably the microscope objective is centred about an optical axis, and wherein the semi-reflective layer forms an angle of between −3° and 3° with the optical axis.

Preferably the beam of radiation is a diverging beam of radiation.

Preferably the transducer is arranged perpendicularly to the optical axis and on one side of the optical axis. Preferably the transducer is in contact with a corner of the beam splitter. In another form, the transducer may be displaced by a small distance from a corner of the beam splitter. Two transducers may be provided, one on either side of the optical axis.

Preferably the semi-reflective layer is configured to reflect at least some of the radiation received at a first end of the beam splitter toward a second end of the beam splitter, the second end being opposite the first end.

Preferably the semi-reflective layer is configured to reflect only radiation that is incident on the beam splitter at an angle that is less than or equal to a maximum acceptance angle calculated using the equation:

$$\begin{cases} \frac{1}{2}l^2(1-\sin^2\theta_2)(1-\sin\theta_1\sqrt{1-\sin^2\theta_1}) = \\ \frac{1}{2}d^2(1-\sin^2\theta_1)(1-\sin\theta_2\sqrt{1-\sin^2\theta_2}) \\ \sin\theta_1 = n\sin\theta_2 \end{cases}$$

Preferably the digital holographic microscope further comprises a processor configured to receive the digital hologram signals from the transducer and to carry out numerical reconstruction based on a plane wavefront reference wave.

Preferably the optical path difference is a wedge-shaped optical path difference.

Preferably the holographic microscope is an off-axis holographic microscope.

In another specific expression, the present invention relates to a method of digital holographic microscopy comprising: providing a beam of radiation from radiation received from an object, the beam of radiation having a phase curvature, splitting the beam of radiation into a first portion and a second portion, introducing an optical path difference between the first and second portions, combining the first and second portions to produce an interference pattern that is substantially free of the phase curvature, and generating digital hologram signals indicative of the interference pattern.

Preferably the steps of splitting, introducing an optical path difference and combining are carried out using a cube beam splitter having a semi-reflective layer.

Preferably the method further comprises carrying out a numerical reconstruction based on a plane numerical reference wave. Preferably the numerical reconstruction comprises: performing a Fourier transform on the digital hologram signals together with the plane numerical reference wave to produce a spectrum of the object, filtering out the spectrum of the object, removing any tilt in phase of the spectrum of the object, and carrying out an inverse Fourier transform on the spectrum of the object. Preferably the numerical reconstruction further includes phase unwrapping. In one form, the step of generating the digital hologram signals is carried out at an imaging plane and the numerical reconstruction includes no propagation of the spectrum of the object to the imaging plane. In an alternative form, the step of generating the digital hologram signals is carried out at a distance from an imaging plane and the numerical reconstruction includes propagation of the spectrum of the object to the imaging plane.

Preferably the step of generating digital hologram signals is carried out using two transducers. In this form, the method may further comprise comparing the digital hologram signals generated by each of the two transducers to produce a more accurate version of the interference pattern.

As will be apparent from the following description, preferred embodiments of the present invention allow digital off-axis holograms to be obtained using a cube beam splitter that both splits and combines a diverging spherical wavefront emerging from a microscope objective. With this arrangement, the phase curvature introduced by the microscope objective together with the illuminating wave to the object wave can be physically compensated when a plane numerical reference wavefront is used for the reconstruction of the recorded digital hologram. The features of the preferred embodiments of the present invention allow an implementation of digital holographic microscopy benefiting from simplicity, minimal number of optical elements, and insensitivity to vibration. These and other related advantages will be readily apparent to skilled persons from the description below.

BRIEF DESCRIPTION OF THE FIGURES

Preferred embodiments of the digital holographic microscope and the method of digital holographic microscopy will now be described with reference to the accompanying figures in which.

DETAILED DESCRIPTION OF THE PREFERRED EMBODIMENTS

Figure 1A:
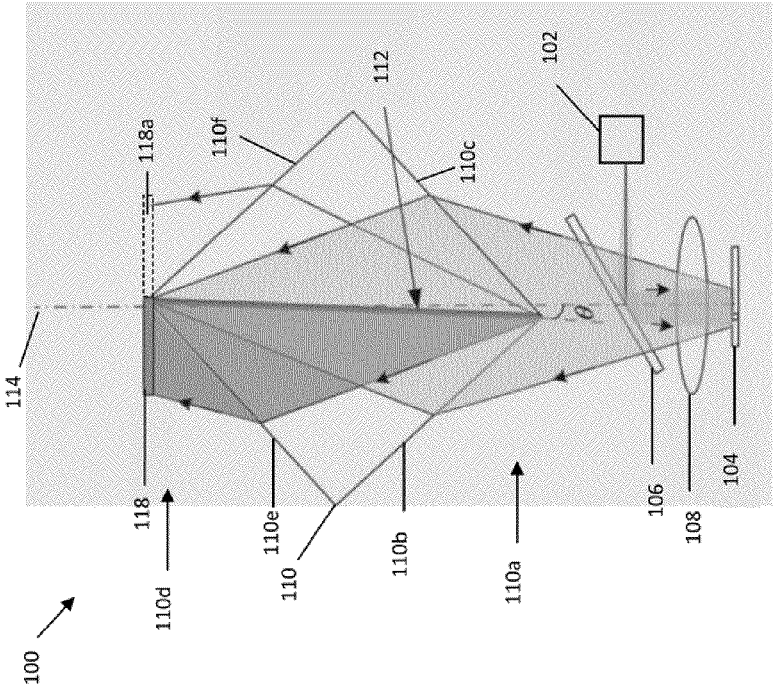
FIG. 1A is a schematic of the digital holographic microscope in a transmission mode embodiment.
Figure 1B:
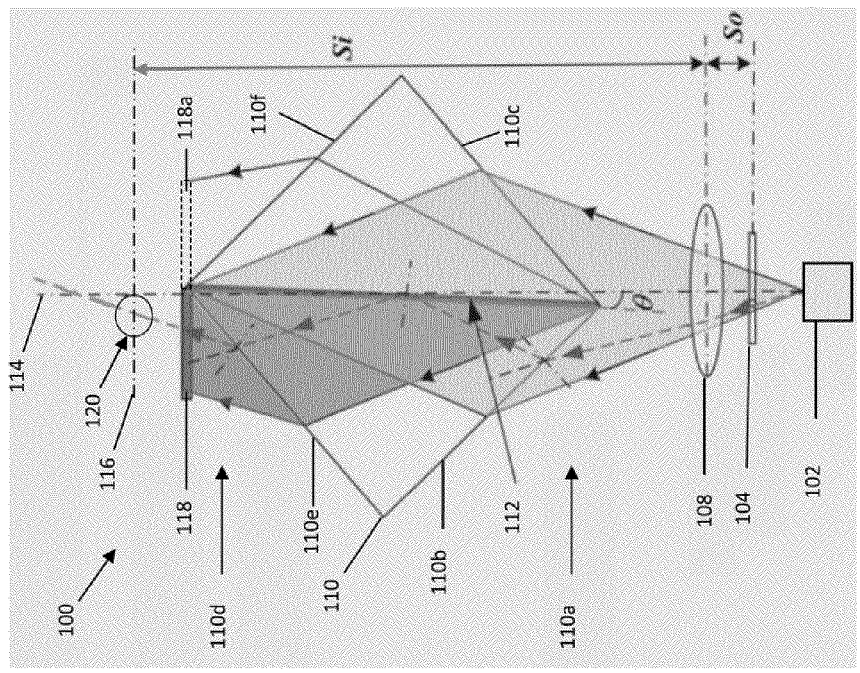
FIG. 1B is a schematic of the digital holographic microscope in a reflection mode embodiment.

Referring to FIGS. 1A and 1B, preferred embodiments of the digital holographic microscope are shown generally as 100. The digital holographic microscope 100 in FIG. 1A is arranged in a transmission mode (where light from a source 102 is transmitted through the object of interest 104), while the digital holographic microscope 100 in FIG. 1B is arranged in a reflection mode (where light from the source 102 is reflected by a beam splitter 106 to the object of interest 104).

Each digital holographic microscope 100 includes a microscope objective 108 and a beam splitter 110. In the preferred form, the beam splitter 110 is a single cube beam splitter that includes a central semi-reflective layer 112 within outer walls of the cube beam splitter 110. The microscope objective 108 is centred about an optical axis 114, while the semi-reflective layer 112 of the cube beam splitter 110 forms a small non-zero angle θ with the optical axis 114. The angle θ is preferably in the range of −3° to 3°. Arranged to one side of the optical axis 114 and before an imaging plane 116 is a transducer 118 in the form of a charge coupled device (CCD) 118. Optionally a second CCD 118a may be provided on the other side of the optical axis 114. Alternatively the CCD 118 may be placed in the location of CCD 118a instead. The CCD 118 in the preferred form is in contact with the corner at the second end 110d of the beam splitter 110 (i.e. there is substantially no distance between the CCD 118 and the corner of the beam splitter 110), and is arranged perpendicularly to the optical axis 114. Alternatively the CCD 118 may simply be arranged in close proximity to (i.e. displaced by a small distance from) the corner of the beam splitter 110. As can be seen in FIG. 1A, the distance between the imaging plane 116 and the microscope objective 108 is denoted as $S_i$, whereas the distance between the microscope objective 108 and the object 104 is denoted as $S_o$. The circle 120 represents the image of the object.

In operation, the light source 102 illuminates the object 104, and light from the object 104 (i.e. the object wave) is received by the microscope objective 108. Light exiting the microscope objective 108 takes the form of a diverging beam of light that is received by the cube beam splitter 110 at a first end 110a on two of its outer walls (herein first and second front walls) 110b, 110c. A first portion of the diverging light (which is received on the first front wall 110b) is refracted toward the semi-reflective layer 112. Some of the first portion is then reflected from the semi-reflective layer 112 toward a first back wall 110e at an opposite end (i.e. second end 110d) of the beam splitter 110. For ease of reference, the reflected first portion will herein be referred to as the 'reflected light' or 'reflected wave'. The amount of reflected light depends on the angle of incidence of the diverging light on the beam splitter 110, as will be detailed later in this specification. The remaining portion of the first portion is transmitted through the semi-reflective layer 112 toward a second back wall 110f. A second portion of the diverging light (which is incident on the second front wall 110c) will also be refracted toward the semi-reflective layer 112. Some of the second portion is transmitted through the semi-reflective layer 112 and will propagate towards the first back wall 110e of the second end 110d of the beam splitter 110. For ease of reference, the transmitted second portion will herein be referred to as the 'transmitted light' or 'transmitted wave'. The remaining portion of the second portion is reflected by the semi-reflective layer 112 toward the second back wall 110f.

It will be appreciated that the splitting of the light incident on the beam splitter 110 is substantially symmetrical about the semi-reflective layer 112 such that there will be 'reflected light' and 'transmitted light' on either side (a first side and a second side) of the semi-reflective layer 112. For clarity, the interaction between the reflected and transmitted light has been illustrated and will herein be described with reference to the first side of the semi-reflective layer 112 only. Skilled persons will appreciate that similar interaction will occur on the second side of the semi-reflective layer 112 with a 90° phase difference relative to the first side.

As will be described in detail later, the reflected light and the transmitted light are arranged to interfere with one another, resulting in a hologram that exits the beam splitter 110 and is captured by the CCD 118 as digital hologram signals. The digital hologram signals may be sent from the CCD 118 to a storage device (e.g. hard disk) for later processing or may alternatively be sent directly to a processor that is configured to carry out numerical reconstruction of the hologram. Any portion of the diverging beam that is not reflected or transmitted will be subjected to total internal reflection, as will be described below with reference to FIG. 2.

Figure 2:
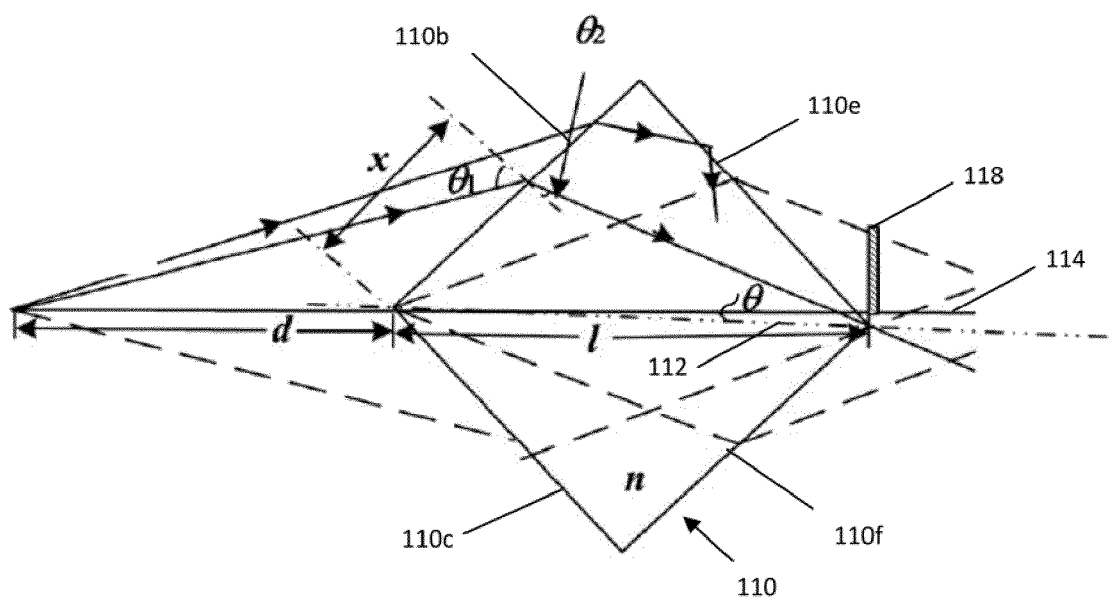
FIG. 2 is a schematic of the ray trajectories in the beam splitter of the digital holographic microscope.

FIG. 2 shows the ray trajectories in the cube beam splitter 110. Specifically, light incident on the first and second front walls 110b, 110c will refract and change its propagation direction inside the cube beam splitter 110. Only refracted light from the first and second front walls 110b, 110c that arrives at the semi-reflective layer 112 and is reflected or transmitted to the first and second back walls 110e, 110f will be output through the cube beam splitter 110. Other rays will travel from the front walls 110b, 110c directly to the back walls 110e, 110f and will suffer from total internal reflection. Because of the small angle θ between the light propagation direction (defined by the optical axis 114) and the semi-reflective layer 112, a wedge-shaped optical path difference (the 'wedge' being defined by the optical axis 114 and the semi-reflective layer 112) will be introduced between the reflected light and the transmitted light. Interference between the reflected light and the transmitted light is therefore made possible and, in the interference plane, an interferogram with a straight fringe pattern is obtainable.

Figure 3:
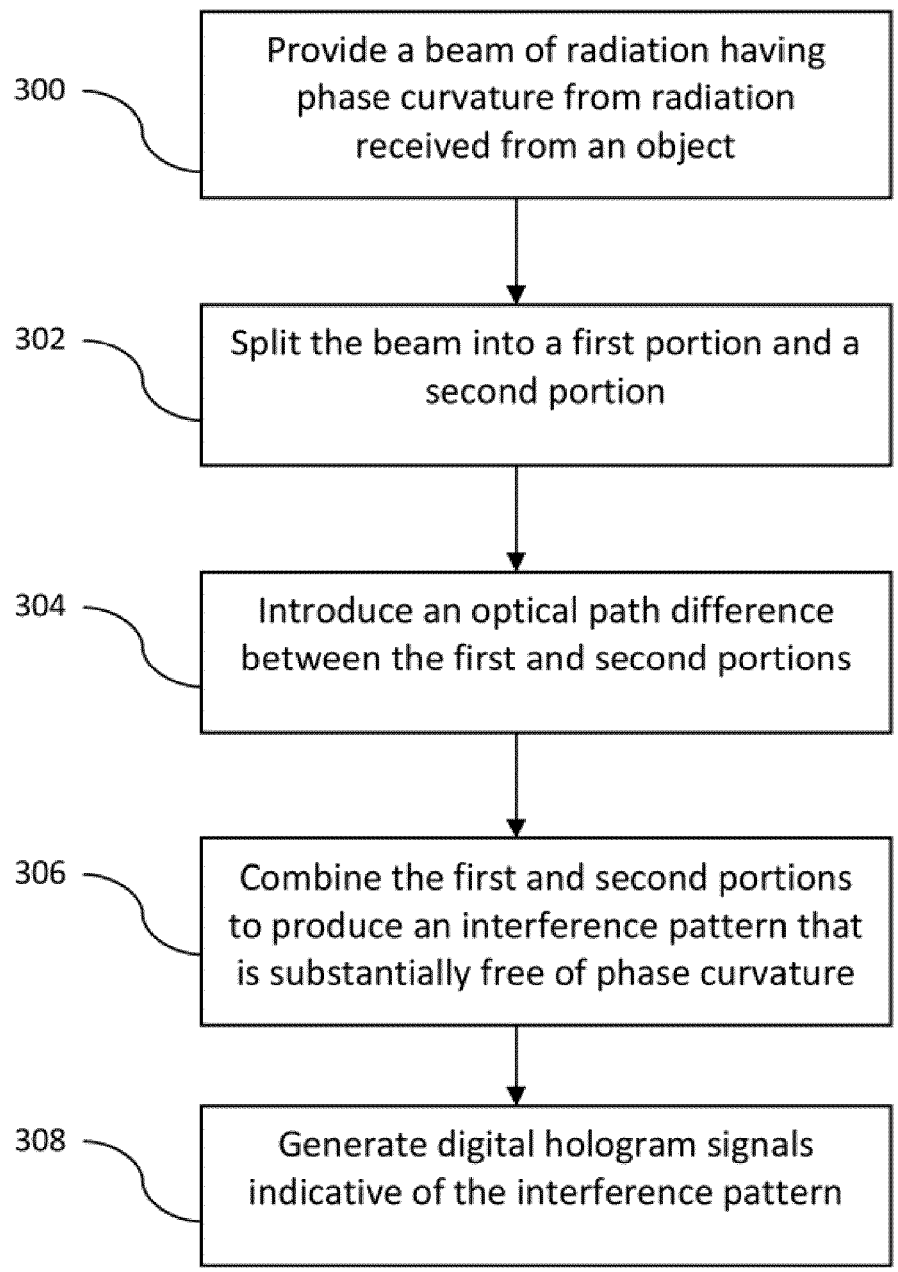
FIG. 3 is a flow chart of the method of digital holographic microscopy.

The above operation is encompassed by the method of the invention, as illustrated in FIG. 3. The method begins at step 300, where a light beam is provided from radiation received from an object. The beam, which has a phase curvature, is then split at step 302 into a first portion and a second portion. At step 304, an optical path difference is introduced between the first and second portions, followed by a combination of the first and second portions in step 306 to produce an interference pattern that is phase compensated. Digital hologram signals indicative of the interference pattern may then be generated in step 308.

Once the digital hologram signals are generated, numerical reconstruction can be carried out to obtain the desired image of the object. Reconstruction is not carried out using an arbitrary numerical reference wave R as it will destroy the physical compensation of the spherical phase curvature. Instead, a plane wavefront is preferred for the numerical reconstruction reference waves. Details of the numerical reconstruction will be described later in this specification with reference to FIGS. 4A to 4E.

In the preferred form, steps 302, 304 and 306 are all carried out by a cube beam splitter having a semi-reflective layer. The use of the cube beam splitter makes the whole optical setup a symmetrical common-path interferometer. That is to say, in the above arrangement and operation, the cube beam splitter works in a non-conventional way that allows it to both split and combine a diverging spherical wavefront emerging from the microscope objective. The cube beam splitter therefore functions as a common-path interferometer, whereby incoming light is separated into two portions that travel the same distance along an 'object arm' and a 'reference arm'. The curvature within the two portions is physically compensated during interference of the first and second portions (i.e. between the reflected and transmitted light).

The physical compensation of phase curvature is shown mathematically below. Given the configuration of FIG. 2, the incident angle of the last ray that can be refracted to reach the semi-reflective layer 112 of the cube beam splitter 110 (i.e. the maximum acceptance angle) is $\theta_1$. The refracted angle is $\theta_2$. The distance between the light source and the cube beam splitter 110 is d. The diagonal length of the cube beam splitter 110 is l. The refractive index of the cube beam splitter 110 is n. Given these parameters, the maximum acceptance angle of the cube beam splitter 110 can be determined by equation (1) below:

$$\begin{cases} \frac{1}{2}l^2(1-\sin^2\theta_2)(1-\sin\theta_1\sqrt{1-\sin^2\theta_1}) = \\ \frac{1}{2}d^2(1-\sin^2\theta_1)(1-\sin\theta_2\sqrt{1-\sin^2\theta_2}) \\ \sin\theta_1 = n\sin\theta_2 \end{cases} \quad (1)$$

It is assumed that the transmitted wave is generated by a point source located at coordinates $(S_{Rx},S_{Ry},(h_r^2-S_{Rx}^2-S_{Ry}^2)^{1/2})$, while the reflected wave is generated by a point source located at coordinates $(S_{Ox},S_{Oy},(h_o^2-S_{Ox}^2-S_{Oy}^2)^{1/2})$, where $h_r$ and $h_o$ are, respectively, the distances between the source points of the transmitted and reflected waves and the recombining location of the two waves. Using quadratic-phase approximations to the spherical waves involved, the corresponding intensity distribution in the pattern of the interference between the two waves is:

$$I_H(x,y) = |O|^2 + |R|^2 + RO^* + R^*O = \quad (2)$$
$$1 + |A_O|^2 + A_O\exp\left[-j\frac{\pi}{\lambda}\left(\frac{S_{Rx}^2}{h_r} - \frac{S_{Ox}^2}{h_o} + \frac{S_{Ry}^2}{h_r} - \frac{S_{Oy}^2}{h_o}\right)\right]$$
$$\exp\left[-j\frac{\pi}{\lambda}\left(\frac{1}{h_r} - \frac{1}{h_o}\right)(x^2+y^2) + j\frac{2\pi}{\lambda}\left(\frac{S_{Rx}}{h_r} - \frac{S_{Ox}}{h_o}\right)x + \right.$$
$$\left. j\frac{2\pi}{\lambda}\left(\frac{S_{Ry}}{h_r} - \frac{S_{Oy}}{h_o}\right)y\right]\exp[-j\varphi(x,y)] +$$
$$A_O\exp\left[j\frac{\pi}{\lambda}\left(\frac{S_{Rx}^2}{h_r} - \frac{S_{Ox}^2}{h_o} + \frac{S_{Ry}^2}{h_r} - \frac{S_{Oy}^2}{h_o}\right)\right]$$
$$\exp\left[j\frac{\pi}{\lambda}\left(\frac{1}{h_r} - \frac{1}{h_o}\right)(x^2+y^2) - j\frac{2\pi}{\lambda h_r}\left(\frac{S_{Rx}}{h_r} - \frac{S_{Ox}}{h_o}\right)x - \right.$$
$$\left. j\frac{2\pi}{\lambda h_r}\left(\frac{S_{Ry}}{h_r} - \frac{S_{Oy}}{h_o}\right)y\right]\exp[j\varphi(x,y)]$$

where O and R represent the reflected wave and transmitted wave respectively. $A_O$ is the amplitude of O and $\phi(x,y)$ is the phase introduced by the test specimen. RO* and R*O are the interference terms with R* and O* denoting the complex conjugate of the waves.

It is observed that R*O are combinations of a spherical wavefront, tilt in the x, y direction, and a constant phase. In the common-path interferometer of the present invention, $h_r = h_o$, $S_{Rx} = -S_{Ox}$, and $S_{Ry} = -S_{Oy}$. Using quadratic-phase approximations to the spherical waves involved, the corresponding intensity distribution in the pattern of the interference between the two waves is $$I_H(x, y) = 1 + |A_O|^2 + \exp\left[j\frac{4\pi(S_{Ox}x + S_{Oy}y)}{\lambda h_o}\right]\exp[-j\varphi(x, y)] + \exp\left[-j\frac{4\pi(S_{Ox}x + S_{Oy}y)}{\lambda h_o}\right]\exp[j\varphi(x, y)] \quad (3)$$

It is clear from the above that, given $h_r = h_O$, the term $$j\frac{\pi}{\lambda}\left(\frac{1}{h_r} - \frac{1}{h_o}\right)(x^2 + y^2)$$

is reduced to zero, thus removing the spherical wavefront component from the equation. In other words, the results above show that the proposed microscope can physically compensate the spherical phase curvature coming from the illuminating waves and microscope objective owing to the common-path interference between the reflected waves and the transmitted waves in the beam splitter.

FIGS. 4A to 4E show the results of an experiment carried out based on the arrangement described above on photoresist refractive transmission lenses. The lenses were formed as described by D. Daly et al in 'The manufacture of microlenses by melting photoresist,' Meas. Sci. Technol. 1, 759-766 (1990). In the experiment, a 20× microscope objective with a numerical aperture of 0.5 is used for microscopic imaging. The size of the cube beam splitter is 30 mm. The hologram is reconstructed at a distance of d=40 mm. For the test object, 20×20 spherical plano-convex microlens arrays (lens diameter of 155 μm, lens pitch of 165 μm, and lens thickness after melting of 16.5 μm) were used in a transmission mode. The wavelength of the light from the light source is 633 nm. The hologram is recorded at a distance before the imaging plane using a CCD in 1280×960 pixels with a square pixel size of 4.65 μm.

Figure 4:
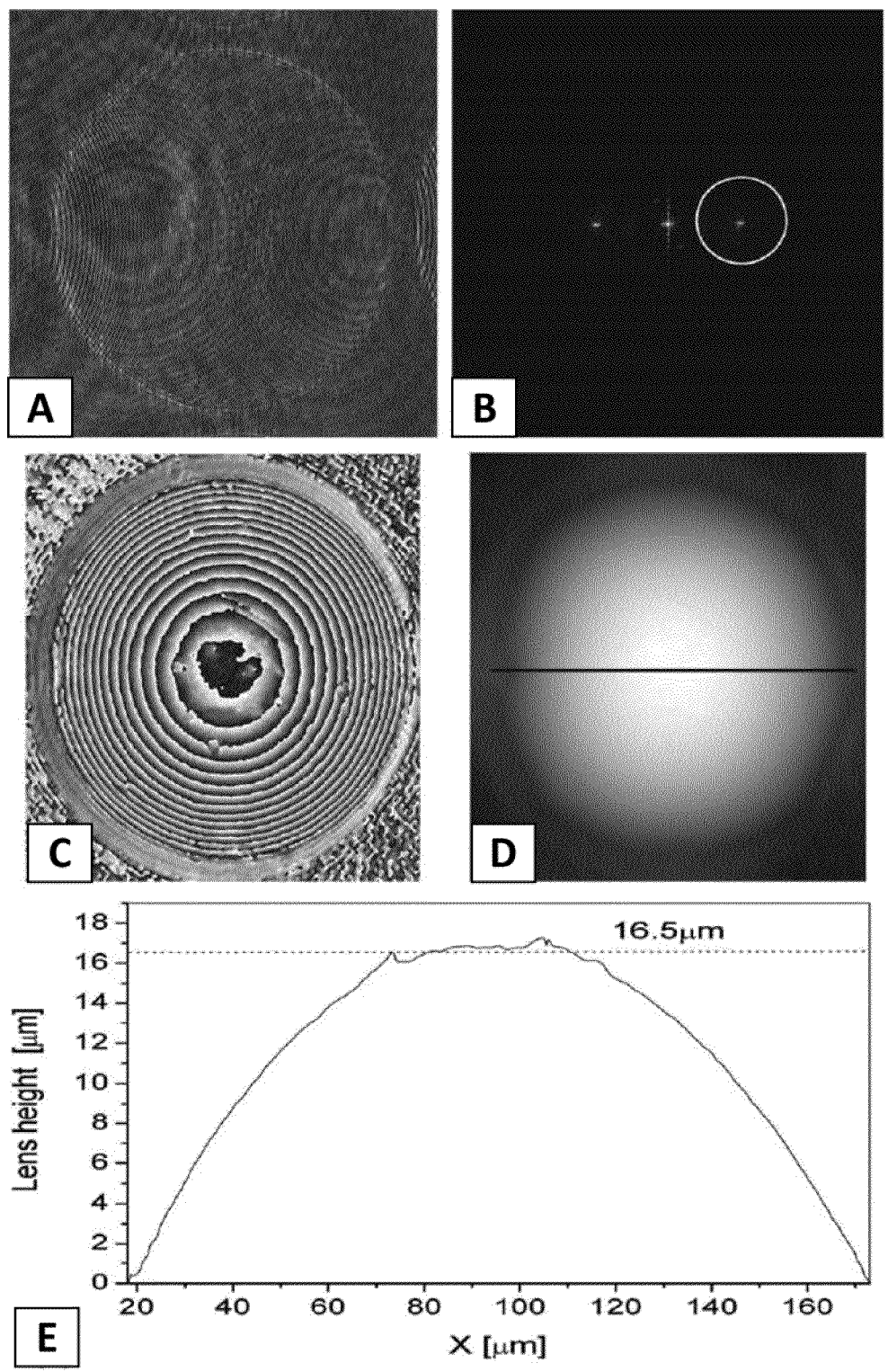
FIG. 4A is a digital hologram recorded in the transmission mode embodiment.
FIG. 4B is an image of the spectra of the hologram of FIG. 4A in the frequency domain.
FIG. 4C is an image of a wrapped phase of FIG. 4B.
FIG. 4D is an image of an unwrapped phase of FIG. 4C.
FIG. 4E is a graph of height profile taken along the dark solid line in FIG. 4D.

The digital hologram signals as recorded forms the image shown in FIG. 4A. As will be known to skilled persons, the hologram signals represent a fringe interference pattern between the reflected and transmitted waves. When a Fourier transform is performed on the hologram signals, the following spectra are obtained: a zero-order spectrum, first-order (i.e. the image of the object) spectrum and a twin-image spectrum. Typically, the zero-order and twin-image spectra are unwanted and so should be removed by filtering the result of the Fourier transform.

In the above experiment, a fast Fourier transform (FFT) was performed on the recorded digital hologram together with the plane numerical reference wave. In mathematical terms, the FFT can be expressed as follows:

$$I_H^F(f_x, f_y) = (1 + |A_O|^2)\delta(f_x, f_y) + \quad (4)$$

$$A_O\delta\left(f_x - \frac{2S_{Ox}}{\lambda h_o}, f_y - \frac{2S_{Oy}}{\lambda h_o}\right) \otimes FFT\{\exp[j\varphi(x, y)]\} +$$

-continued $$A_O\delta\left(f_x + \frac{2S_{Ox}}{\lambda h_o}, f_y + \frac{2S_{Oy}}{\lambda h_o}\right) \otimes FFT\{-\exp[j\varphi(x, y)]\}$$

where $\otimes$ denotes convolution. The space period of the achieved fringe pattern will decide for the separation of the first order from the zero order in the Fourier plane. In general, the smaller the space period is, the larger the separation will be. Given the symmetrical splitting of the beam, the light source may be considered as two separate light sources. The distance between the two light sources is $s = 2(S_{Ox}^2 + S_{Oy}^2)^{1/2} = 2h_o \sin\theta$. The distance between the light source and the observed plane is $S = (h_o^2 - S_{Ox}^2 - S_{Oy}^2)^{1/2} = h_o \cos\theta$. Accordingly, the space period of the fringe pattern is:

$$\Delta = \frac{S\lambda}{s} = \frac{\lambda}{2\tan\theta} \quad (5)$$

This shows that the space period is only related to the wavelength of the light used and the angle θ between the light propagation direction and the central semi-reflective layer. The location of the light source will not affect the space period of the fringe pattern of the interferogram achieved. A bigger θ will offer a larger separation of the spectra, which is useful for spectrum selection as described below, but ultimately the θ value is limited by the resolution of the CCD. In the experiment, the θ used is about 2°.

In the spatial frequency domain, unwanted spectra and any tilt in phase of the spectrum for the original test object are removed. Referring to FIG. 4B, the test object's spectrum is marked by a white circle. This spectrum is filtered out and moved to the centre of the calculation plane to remove the tilt in phase. This leaves the Fourier transform of the original test object $\psi^{HF}$ as:

$$\psi^{HF}(f_x, f_y) = A_O \exp\delta(f_x, f_y) \otimes FFT\{\exp[j\varphi(x,y)]\} \quad (6)$$

To complete the numerical reconstruction by the conventional angular spectrum method, the Fourier spectrum of the test object is propagated to the imaging plane. This of course is not necessary if the CCD was located at the imaging plane itself. An inverse Fourier transform is then carried out on the spectrum of the test object. Mathematically, this can be expressed as:

$$\begin{cases} \psi^1(n\Delta x_i, m\Delta y_i) = \frac{\exp(jkd)}{j\lambda d} FFT^{-1}\{FFT\{\psi^H(n\Delta x_H, m\Delta y_H)\} \cdot \\ G(n\Delta f_x, m\Delta f_y)\} \\ G(n\Delta f_x, m\Delta f_y) = \exp\left[j\frac{2\pi d}{\lambda}\sqrt{1 - (\lambda n\Delta f_x)^2 - (\lambda m\Delta f_y)^2}\right] \end{cases} \quad (7)$$

where n and m are integers ($-M/2 \leq n \leq M/2$, $-N/2 \leq m \leq N/2$, and M×N is the number of pixels of the CCD), and $G(n\Delta f_x, m\Delta f_y)$ is the optical transfer function in the spatial frequency domain. The relationship between the sampling intervals of the hologram plane $(\Delta x, \Delta y)$ and that of the image plane $(\Delta x_i, \Delta y_i)$ is $$\Delta x_i = \frac{1}{N\Delta f_x} = \Delta x \text{ and } \Delta y_i = \frac{1}{M\Delta f_y} = \Delta y,$$

where $\Delta f_x$ and $\Delta f_y$ are the sampling intervals in the spatial frequency domain.

The reconstructed phase image is shown in FIG. 4C. There is obviously no spherical phase owing to the microscope objective (spherical phase presence would be noticeable by way of distortion of the phase obtained).

As will be familiar to those skilled in the art, a reconstructed phase image such as that of FIG. 4C includes phase jumps (which appear as contours of white to black or black to white) that correspond to a variation of +π to −π, or −π to +π. When such wrapping occurs, the resulting phase image is called a wrapped phase image. Even from the wrapped phase image of FIG. 4C, the image of the object is clearly shown without phase curvature. The physical compensation of the proposed setup is therefore clearly demonstrated. Preferably, to reduce the influence of noise coming from the test object itself on the measured phase image, the reconstructed phase image is phase-unwrapped to provide the correct phase distribution as shown in FIG. 4D. The height profile taken along the dark solid line in FIG. 4D is shown in FIG. 4E and agrees well with the known lens parameters.

It will be appreciated from the above description that the present invention's physical compensation ability for the spherical phase curvature introduced by the microscopic objective and the illuminating waves of the proposed setup can simplify the numerical reconstruction process significantly since numerical phase masks are not needed. A simple plane numerical reference wavefront is sufficient for the reconstruction to produce, after phase unwrapping, the correct quantitative phase map of a test object. Accordingly, an accurate magnified image of the test object can be obtained using holography in less time with less processing demands (thus making the invention more cost-effective). Also, the need for reference-specific optical elements is obviated. Sensitivity to vibration is also reduced since any vibration affecting the beam splitter affects both portions of the beam in the same way and, as such, its effects are cancelled when the two portions undergo interference. Similar compensation takes place for any aberration of the microscope objective. Accordingly, the present invention benefits from simplicity, minimal number of optical elements, and insensitivity to vibration and microscope objective aberrations.

The foregoing describes preferred embodiments, which, as will be understood by those skilled in the art, may be subject to variations or modifications in design, construction or operation without departing from the scope of the claims. For example, with regard to the source, it is not essential that a diverging beam be provided. It is possible to use a collimated beam (e.g. a laser beam) instead. This is also the case for the beam exiting the microscope objective. In other words, the diverging or non-diverging nature of the beam exiting the source and microscope objective is irrelevant to the working of the invention and so may be replaced with other forms where desired.

With regard to the beam splitter, while the preferred embodiment digital holographic microscope uses no more than one cube beam splitter, this is not essential. The beam splitter may be a truncated cube or two or more triangular prisms spaced from one another. Skilled persons will appreciate that all that is required of the beam splitter is the ability to split incoming light into two portions, introduce an optical path difference between the two portions, and combine the portions. It is also not essential for the beam splitter to receive light directly from the microscope objective since further optical elements may be placed between the front walls of the beam splitter and the microscope objective.

With regard to the transducer, it is not essential that a single transducer be provided on one side of the optical axis. It will be understood from the foregoing description that the symmetrical nature of the beam splitter interferometer results in holograms being formed on both sides of the optical axis (with a 90° phase difference between them). The transducer may therefore be placed on either side or on both sides of the axis. Where hologram detection is carried out on both sides of the axis, the holograms may be compared or matched taking into account their phase difference to produce a more accurate version of the hologram. It is also not essential to place the transducer before the imaging plane. Where necessary or desired, the transducer can be placed at the imaging plane (in which case the propagation step in the reconstruction process can be dispensed with and the value of d in equation (7) may be set to zero). Also, where necessary or desired, the transducer may be displaced from the beam splitter. These variations, for instance, are intended to be covered by the scope of the claims.

The invention claimed is:

1. A digital holographic microscope comprising:
   a microscope objective configured to receive radiation from an object and to provide a beam of radiation having a phase curvature,
   a beam splitter configured to split the beam of radiation into a first portion and a second portion, introduce an optical path difference between the first and second portions, and combine the first and second portions to produce an interference pattern that is substantially free of the phase curvature, and
   a transducer configured to generate digital hologram signals indicative of the interference pattern.

2. The digital holographic microscope of claim 1, wherein the beam splitter is a cube beam splitter having a central semi-reflective layer.

3. The digital holographic microscope of claim 2, wherein the cube beam splitter is arranged to receive the beam of radiation on two outer walls.

4. The digital holographic microscope of claim 1, wherein the microscope objective is centred about an optical axis, and wherein the semi-reflective layer forms an angle of between −3° and 3° with the optical axis.

5. The digital holographic microscope of claim 1, wherein the beam of radiation is a diverging beam of radiation.

6. The digital holographic microscope of claim 4, wherein the transducer is arranged perpendicularly to the optical axis and on one side of the optical axis.

7. The digital holographic microscope of claim 6, wherein the transducer is in contact with a corner of the beam splitter.

8. The digital holographic microscope of claim 6, wherein the transducer is displaced by a small distance from a corner of the beam splitter.

9. The digital holographic microscope of claim 6, wherein two transducers are provided, one on either side of the optical axis.

10. The digital holographic microscope of claim 2, wherein the semi-reflective layer is configured to reflect at least some of the radiation received at a first end of the beam splitter toward a second end of the beam splitter, the second end being opposite the first end.

11. The digital holographic microscope of claim 10, wherein the semi-reflective layer is configured to reflect the radiation that is incident on the beam splitter at an angle that is less than or equal to a maximum acceptance angle calculated using the equation:

$$\begin{cases} \frac{1}{2}l^2(1-\sin^2\theta_2)(1-\sin\theta_1\sqrt{1-\sin^2\theta_1}) = \\ \frac{1}{2}d^2(1-\sin^2\theta_1)(1-\sin\theta_2\sqrt{1-\sin^2\theta_2}) \\ \sin\theta_1 = n\sin\theta_2. \end{cases}$$

12. The digital holographic microscope of claim 1, further comprising a processor configured to receive the digital hologram signals from the transducer and to carry out numerical reconstruction based on a plane wavefront reference wave.

13. The digital holographic microscope of claim 1, wherein the optical path difference is a wedge-shaped optical path difference.

14. The digital holographic microscope of claim 1, wherein the holographic microscope is an off-axis holographic microscope.

15. A method of digital holographic microscopy comprising:
providing a beam of radiation from radiation received from an object, the beam of radiation having a phase curvature,
splitting the beam of radiation into a first portion and a second portion,
introducing an optical path difference between the first and second portions,
combining the first and second portions to produce an interference pattern that is substantially free of the phase curvature, and
generating digital hologram signals indicative of the interference pattern.

16. The method of claim 15, wherein the steps of splitting, introducing an optical path difference and combining are carried out using a cube beam splitter having a semi-reflective layer.

17. The method of claim 15, further comprising carrying out a numerical reconstruction based on a plane numerical reference wave.

18. The method of claim 17, wherein the numerical reconstruction comprises:
performing a Fourier transform on the digital hologram signals together with the plane numerical reference wave to produce a spectrum of the object,
filtering out the spectrum of the object,
removing any tilt in phase of the spectrum of the object, and
carrying out an inverse Fourier transform on the spectrum of the object.

19. The method of claim 18, wherein the numerical reconstruction further includes phase unwrapping.

20. The method of claim 18, wherein the step of generating the digital hologram signals is carried out at an imaging plane and wherein the numerical reconstruction includes no propagation of the spectrum of the object to the imaging plane.

21. The method of claim 18, wherein the step of generating the digital hologram signals is carried out at a distance from an imaging plane and wherein the numerical reconstruction includes propagation of the spectrum of the object to the imaging plane.

22. The method of claim 15, wherein the step of generating digital hologram signals is carried out using two transducers.

23. The method of claim 22, wherein the method further comprises comparing the digital hologram signals generated by each of the two transducers to produce a more accurate version of the interference pattern.

* * * * *